(12) United States Patent
Endo et al.

(10) Patent No.: US 7,054,668 B2
(45) Date of Patent: May 30, 2006

(54) MAKEUP MIRROR APPARATUS AND MAKEUP METHOD USING THE SAME

(75) Inventors: Hiroshi Endo, Saitama (JP); Yoko Matsumoto, Saitama (JP)

(73) Assignee: FUji Photo Film Co., Ltd., Kanagawa (JP)

( * ) Notice: Subject to any disclaimer, the term of this patent is extended or adjusted under 35 U.S.C. 154(b) by 267 days.

(21) Appl. No.: 10/234,325

(22) Filed: Sep. 5, 2002

(65) Prior Publication Data

US 2003/0041871 A1   Mar. 6, 2003

(30) Foreign Application Priority Data

Sep. 5, 2001  (JP)  ............................ 2001-268722
Apr. 25, 2002  (JP)  ............................ 2002-124443

(51) Int. Cl.
   *H04M 1/00*   (2006.01)
(52) U.S. Cl. ..................................................... 455/566
(58) Field of Classification Search ................ 132/291, 132/296, 301, 316, 304, 200; 455/566; 206/581
   See application file for complete search history.

(56) References Cited

U.S. PATENT DOCUMENTS 4,434,467 A * 2/1984 Scott ........................... 700/90
5,475,441 A * 12/1995 Parulski et al. .............. 348/552
6,073,034 A * 6/2000 Jacobsen et al. ............. 455/566
6,208,380 B1 * 3/2001 Misawa ..................... 348/231.9
6,311,077 B1 * 10/2001 Bien .......................... 455/566
6,362,851 B1 * 3/2002 Lavelle et al. ......... 348/333.01
6,424,843 B1 * 7/2002 Reitmaa et al. .............. 455/566
6,788,919 B1 * 9/2004 Watanabe ................... 455/90.3

FOREIGN PATENT DOCUMENTS

| JP | 10-108730 | | 4/1998 |
| JP | 11046855 A | * | 2/1999 |
| JP | 2002247175 A | * | 8/2002 |

* cited by examiner

*Primary Examiner*—John J. Wilson
*Assistant Examiner*—Robyn Doan
(74) *Attorney, Agent, or Firm*—Sughrue Mion, PLLC

(57) ABSTRACT

A makeup mirror apparatus comprises a case body, a case lid, and a rotary shaft rotatably connecting the case body and the case lid. The case body is provided with a cosmetic-material containing area, a brush containing area, and operation buttons. The case lid is provided with a mirror unit, a camera portion, and a memory slot. The mirror unit is constituted such that an LCD panel is stacked on a half mirror. By manipulating the operation button, a sample image is read from a memory card loaded in the memory slot. The read sample image is displayed on the LCD panel and is overlapped with a user's face reflected in the half mirror. Makeup is performed by tracing the sample image.

17 Claims, 10 Drawing Sheets

MAKEUP MIRROR APPARATUS AND MAKEUP METHOD USING THE SAME

BACKGROUND OF THE INVENTION

1. Field of the Invention

The present invention relates to a makeup mirror apparatus reflecting a user thereof when making up, and also relates to a makeup method using the makeup mirror apparatus.

2. Description of the Related Art

At a finishing stage for making up, it is usually performed to write eyebrows and to use a lipstick. It is very difficult, however, to finish one's makeup in a fine state such as to be finished by a professional makeup artist. In view of this, as a tool for finishing one's makeup in a finer state, a makeup template tends to be widely used such as described in Japanese Patent Laid-Open Publication No. 10-108730. This template is a plastic sheet having frame openings, which are formed in preferable shapes of an eyebrow and a lip. The template is put to the eyebrow and the lip to use an eyebrow pencil, an eye pencil and a lipstick.

The above makeup template is put to a user's face in order to write the eyebrow and in order to use the lipstick so that it is necessary to use one hand for the purpose of pressing the template. Hence, the eyebrow must be written and the lipstick must be used only by the other hand so that dexterity is required for making up, further, experience is necessary to some extent for finishing one's makeup in a beautiful state. Meanwhile, when the hand pressing the template tires, a position of the template put on the face is likely to be shifted. Accordingly, there arises a problem in that positions of the written eyebrow and the applied lipstick are also shifted.

In the meantime, a fashionable style exists in the makeup. The fashion rapidly changes so that the makeup is remote from the current fashion if a user continues to use a single kind of the template. Thus, it is necessary to prepare the new template in accordance with the fashion whenever the newest makeup style is introduced.

SUMMARY OF THE INVENTION

In view of the foregoing, it is a primary object of the present invention to provide a makeup mirror apparatus and a makeup method using the same, in which it is possible to easily finish one's makeup in a beautiful state.

It is a second object of the present invention to provide a makeup mirror apparatus and a makeup method using the same, in which it is possible to immediately adapt one's makeup to a newest makeup style.

In order to achieve the above and other objects, the makeup mirror apparatus according to the present invention comprises a mirror for reflecting a user, and an electronic display for displaying a sample image used for performing one's makeup. The mirror and the electronic display are preferable to be contained in a compact case.

In a preferred embodiment, a half mirror is used as the mirror and is disposed in front of the electronic display. Further, an LCD (liquid crystal display) panel is used as the electronic display. The LCD panel displays the sample image which is read from a memory card loaded in the compact case. The sample image displayed on the LCD panel is overlapped with a face of the user reflected in the half mirror. The user's face is made up by tracing the sample image.

In another embodiment, the mirror and the electronic display are unified to constitute a mirror unit. A camera portion is removably attached to the mirror unit. The camera portion is removed from the mirror unit and is held by a user's hand. In virtue of this, it is possible to image a detail of the user's face. Incidentally, the camera portion is preferable to be provided with an attachment to which a cosmetic tool for making up is detachably attached.

According to the makeup mirror apparatus of the present invention, it is possible to carry out fine operations of one's makeup, and the makeup may be easily finished in a beautiful state. Moreover, it is also possible to bring in a newest makeup style without delay.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
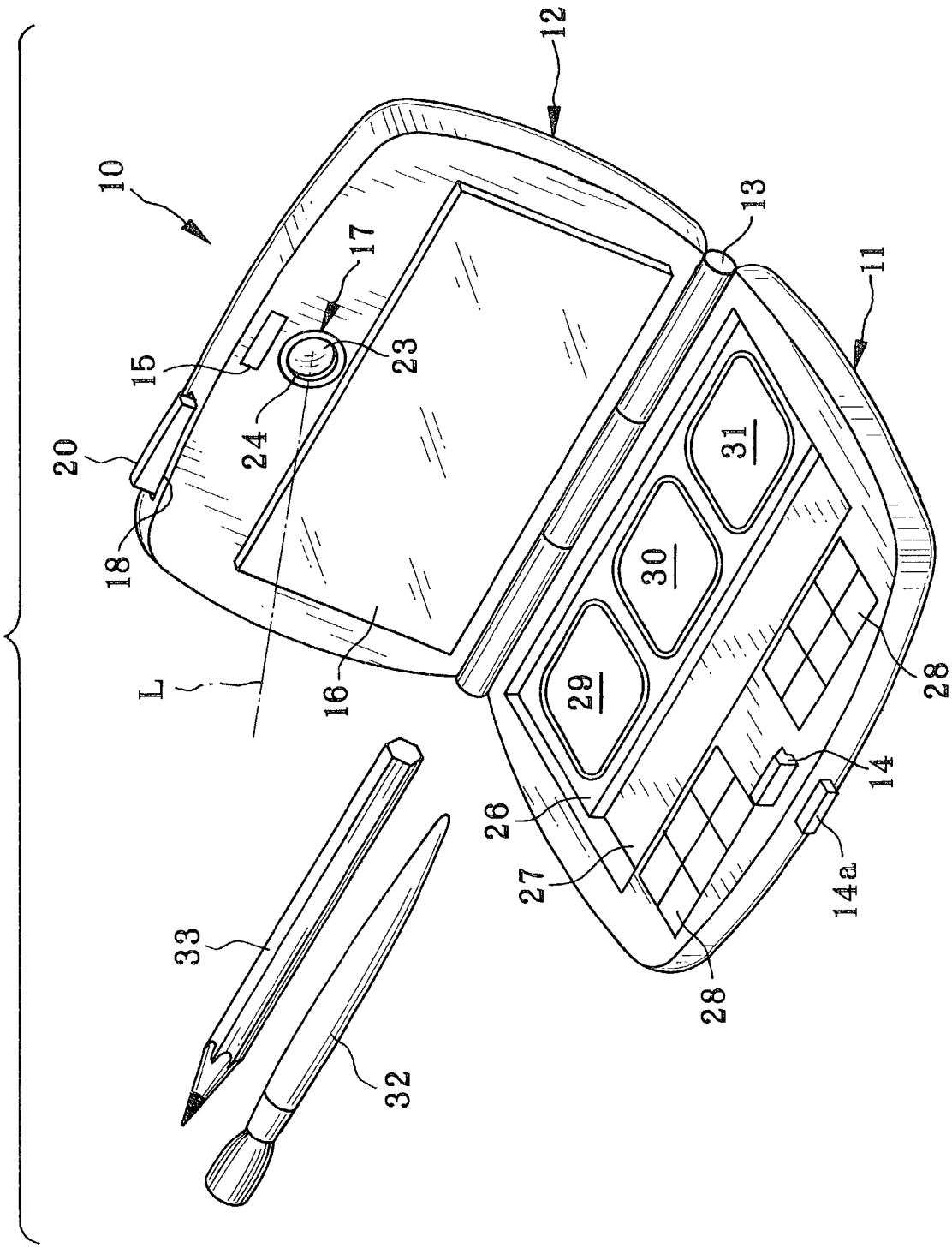
FIG. 1 is a perspective view showing a usage state of a makeup mirror apparatus according to the present invention.
Figure 2:
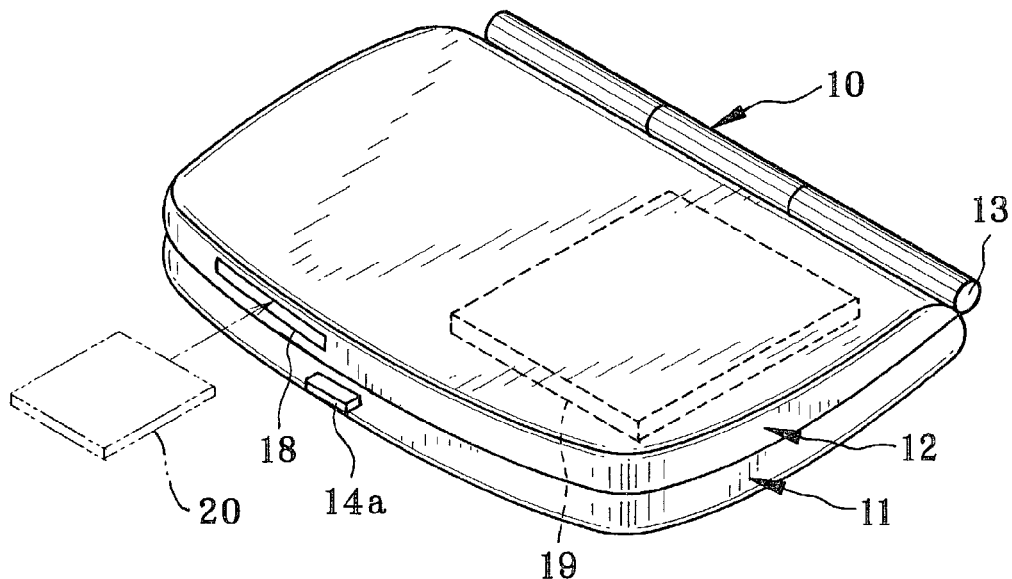
FIG. 2 is a perspective view showing a non-usage state of the makeup mirror apparatus.

FIGS. 1 and 2 respectively show a usage state and a non-usage state of a makeup mirror apparatus 10 according to the present invention. An external shape of the makeup mirror apparatus 10 is identical with that of a cosmetic compact case. The makeup mirror apparatus 10 is constituted of a case body 11 and a case lid (upper lid) 12. The case lid 12 is rotatably attached to the case body 11 via a rotary shaft 13 provided at an end edge thereof. Each of the case body 11 and the case lid 12 is formed in a rectangular flat shape having a roundish form as a whole and having a gently curved surface. Owing to this, when the case lid 12 is closed, the makeup mirror apparatus 10 has a compact-and-portable shape so as to be easily carried.

A front end of the case body 11 is provided with a claw 14 integrally formed with a button 14a. The case lid 12 is formed with an engagement hole 15 located at a position corresponding to the claw 14. Meanwhile, a spring (not shown) is incorporated inside the rotary shaft 13. This spring urges the case lid 12 toward an open position shown in FIG. 1. When the case lid 12 is kept in a closed position shown in FIG. 2, the claw 14 engages with the engagement hole 15 to lock the case lid 12 at the closed position. Upon pushing the button 14a downward, the claw 14 is released from the engagement hole 15 so that the case lid 12 is rotated toward the open position by means of the spring incorporated in the rotary shaft 13.

An inner surface of the case lid 12 is provided with a mirror unit 16 and a camera portion 17, further, the outside thereof is formed with a memory slot 18. With respect to a detachable memory card 20 loaded into the memory slot 18, are used smart media (registered trademark) and so forth. The case lid 12 has a built-in power battery 19. As to the power battery 19, a sheet battery having a flat shape is used in order to thin the case lid 12 down.

The mirror unit 16 is constituted of an LCD panel 21 (see FIG. 3) and a half mirror 22. The LCD panel 21 is fixed to the inner surface of the case lid 12. The half mirror 22 is attached so as to cover the front of the LCD panel 21. The half mirror 22 is the so-called semitransparent mirror. An image displayed on the LCD panel 21 is observed from the outside through the half mirror 22.

The LCD panel 21 displays a sample image read from the memory card 20 in which data of the sample images of fifty or more, for instance, are stored. The sample images include various patterns of eyebrows and contours of lips. When the makeup mirror apparatus 10 is used, the sample image read from the memory card 20 is displayed on the LCD panel 21, and at the same time, a user's face is reflected in the half mirror 22. The user's face reflected in the half mirror 22 is overlapped with the sample image displayed on the LCD panel 21 to trace a contour of the sample image. Owing to this, it is possible to finish one's makeup in a beautiful state. The sample image to be displayed on the LCD panel 21 is stored in a storage medium of the memory card so that it is possible to always adapt the makeup to the newest style by changing the memory card 20. Incidentally, the way of obtaining the new sample image is not exclusive to the change of the memory card 20. The memory card 20 removed from the makeup mirror apparatus 10 may be connected to a personal computer, a communication terminal and so forth to store image data of the sample image, which is sent via a telephone station, in the memory card. Alternatively, the makeup mirror apparatus 10 may have a communication function to receive the image data of the sample image. The received image data is stored in the memory card 20.

The camera portion 17 is formed with a taking window 24 for exposing a taking lens 23 behind which a CCD image sensor 25 (see FIG. 3) is disposed. The camera portion 17 is positioned at an upper portion of the mirror unit 16. An optical axis L of the taking lens and a focal length thereof are set such that the user's face is imaged when the user confronts the front of the mirror unit 16. The camera portion 17 is used for the purpose of finishing the makeup in a more beautiful state rather than the ordinary makeup. The user's face is taken by the camera portion 17, and a part of the taken face is enlarged and is displayed on the LCD panel 21. The sample image to be overlapped with the enlarged part of the face is also enlarged and displayed. Tracing is performed by using the enlarged image so that the fine makeup may be easily performed.

The inner surface of the case body 11 is provided with a cosmetic-material containing area 26, a brush containing area 27, and operation buttons 28. The cosmetic-material containing area 26 contains cosmetic materials 29, 30 and 31 used for writing the eyebrow. The cosmetic materials 29, 30 and 31 have different colors of brown, dark brown and gray, for instance.

The brush containing area 27 has an oblong concave shape and contains an eyebrow brush 32, an eye pencil 33 and so force necessary for writing the eyebrow. The operation buttons 28 includes a mode switching button and an adjustment button. The mode switching button is used for changing a normal mode and an enlargement mode utilizing the camera portion 17. The adjustment button is used for selecting the sample image to be displayed on the LCD panel 21, and is also used for adjusting a display magnification of the sample image and a magnification of the image taken by the camera portion 17. All of the buttons for executing various operations are arranged.

Figure 3:
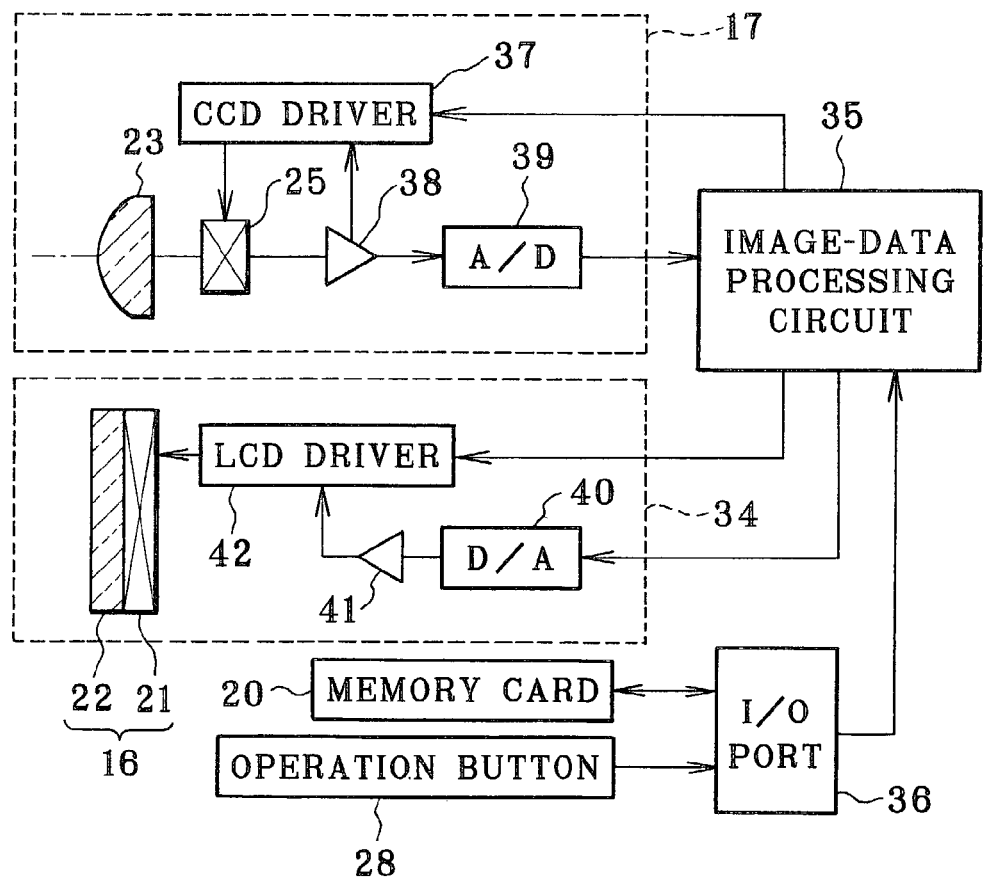
FIG. 3 is a block diagram schematically showing an electrical structure of the makeup mirror apparatus.

FIG. 3 schematically shows an electrical structure of the makeup mirror apparatus 10 of the present invention. The makeup mirror apparatus 10 is roughly divided into two portions of an LCD display portion 34 and the camera portion 17. These portions are controlled by an image-data processing circuit 35.

The image-data processing circuit 35 totally controls electrical operations of the makeup mirror apparatus 10, for instance, the display of the sample image read from the memory card 20, and the display of the user's face taken by the camera portion 17. The image-data processing circuit 35 monitors signals, which are inputted from the operation buttons 28 via an I/O port 36, to perform signal processing in accordance with the inputted signal. The memory card 20 is used for both of writing and reading.

The camera portion 17 is mainly constituted of members necessary for imaging the user's face. The CCD image sensor 25 is disposed behind the taking lens 23. By focusing the taking lens 23, a subject image is formed on a photoelectric surface of the CCD image sensor 25. A CCD driver 37 drives the CCD image sensor 25 to convert the optical subject image into an electric image signal to be outputted. The outputted image signal is amplified by an amplifier 38 up to an appropriate level. After that, the image signal is digitally converted by an A-D converter 39 and is inputted into the image-data processing circuit 35.

Under the normal mode, the image-data processing circuit 35 outputs the data of the sample image, which is read from the memory card 20, to an LCD driver 42 via a D-A converter 40 and an amplifier 41. Meanwhile, under the enlargement mode, the image-data processing circuit 35 outputs the image data, in which the user's face taken by the camera portion 17 is enlarged, to the LCD driver 42 in addition to the sample image. Owing to this, on the LCD panel 21 driven by the LCD driver 42, the sample image is displayed under the normal mode. In contrast, under the enlargement mode, the composed image of the sample image and the enlarged image of the user's face is displayed on the LCD panel 21.

Figure 4:
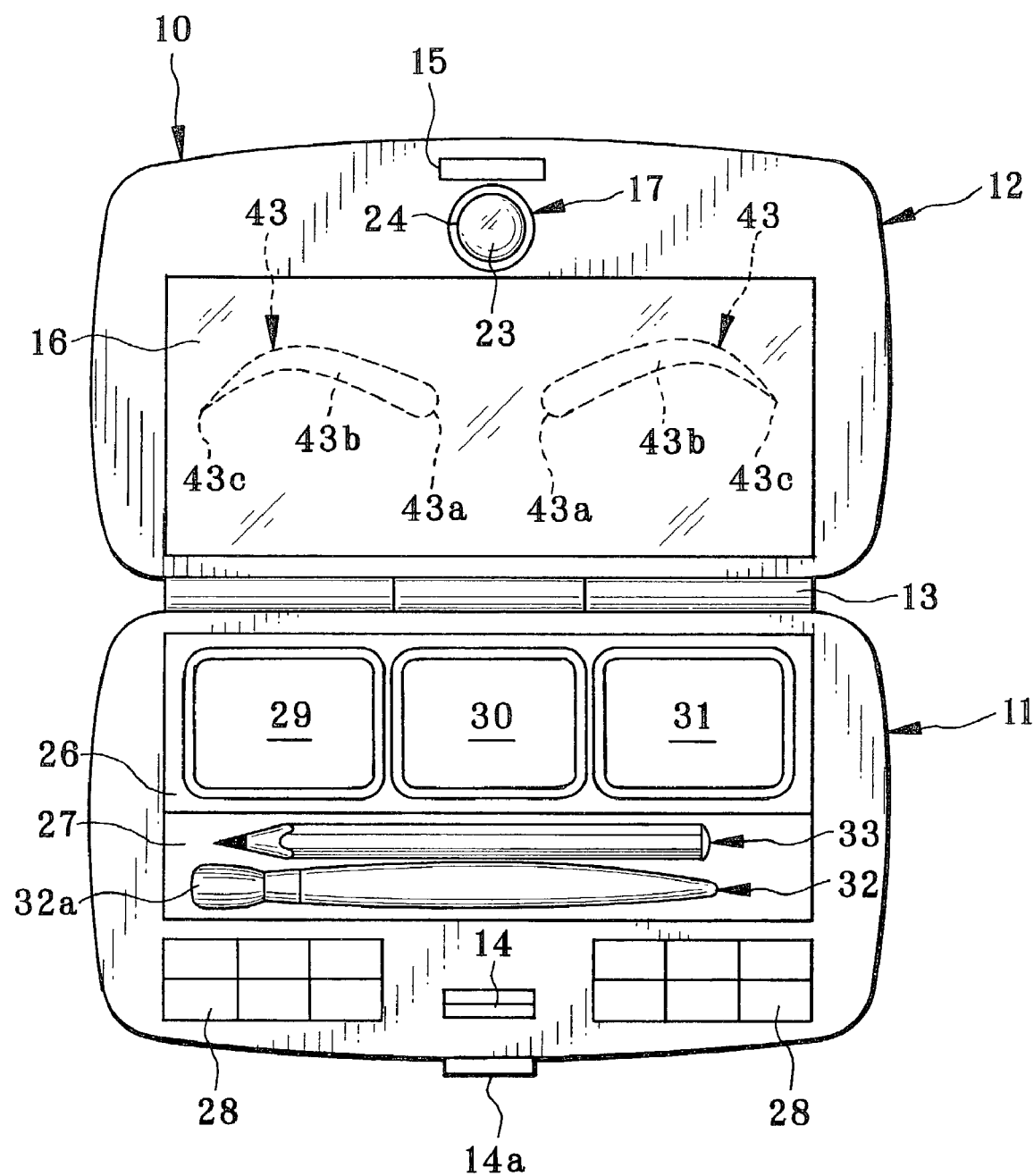
FIG. 4 is an explanatory illustration showing a state in that an LCD panel of the makeup mirror apparatus displays a sample image.
Figure 5:
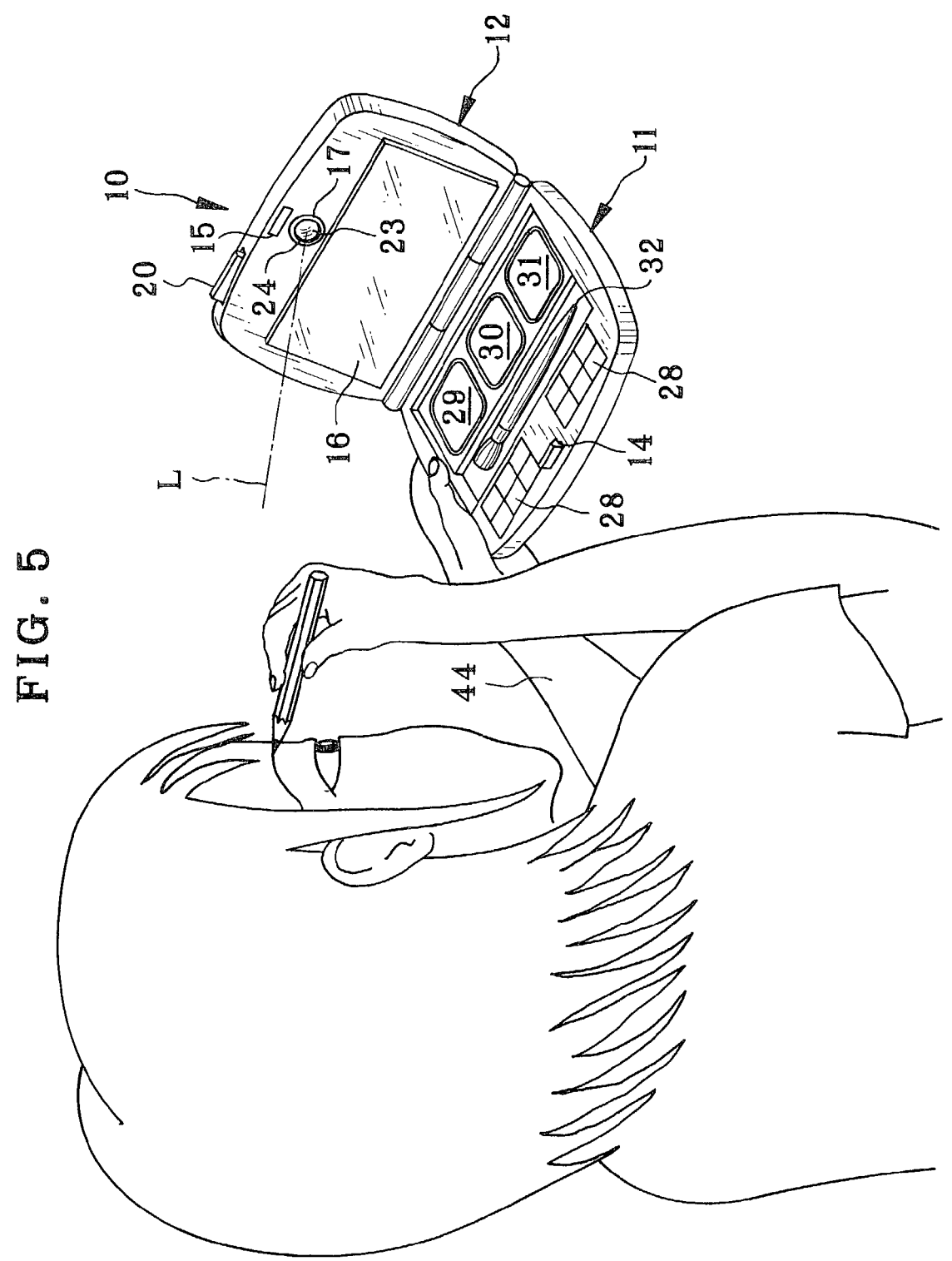
FIG. 5 is a perspective view showing a state in that a user holds the makeup mirror apparatus to use it.

Next, an operation of the above structure is described below. When the makeup mirror apparatus 10 is used, the case lid 12 is opened first to set the usage state. Then, the operation button 28 is pressed to turn on the power supply. The normal mode is selected at the outset. Upon selecting the normal mode, shapes of eyebrows 43 of the sample image are displays on the LCD panel 21 such as shown in FIG. 4. The user changes the sample image by using the operation button 28 until the sample image of a favorite shape is displayed. After determining the sample image, the makeup mirror apparatus 10 is held such as shown in FIG. 5. A position of the eyebrow 43 of the sample image displayed on the LCD panel 21 is overlapped with a position of the user's eyebrow reflected in the half mirror 22. In this state, the makeup is performed.

When making up the eyebrow, one of the cosmetic materials 29 to 31 is put on a tip 32a of the eyebrow brush 32 to apply it to the user's face. At this time, the cosmetic material is applied, tracing the outline of the eyebrow 43 of the sample image so as not to straggle therefrom. By the way, in addition to the application of the cosmetic material, the length of the user's eyebrow is sometimes adjusted with scissors and the user's eyebrow of superfluous portions are sometimes pulled with tweezers. Also in these cases, the user's eyebrow may be cut and pulled relative to a portion located outside the eyebrow 43 of the sample image. Moreover, when the eyebrow is made up, the cosmetic material is applied so as to change a kind of the color and a tone thereof in accordance with the respective portions of the eyebrow, for example, in accordance with a leading portion 43a, a middle portion 43b, and a trailing portion 43c. As to the eyebrow 43 of the sample image, the kind of the color and the tone thereof are shown by a color image. Thus, the user applies the cosmetic material to the user's eyebrow with the eyebrow brush 32 and writes the user's eyebrow with the eye pencil 33 so as to correspond to the color of the eyebrow 43 of the sample image.

Figure 6A:
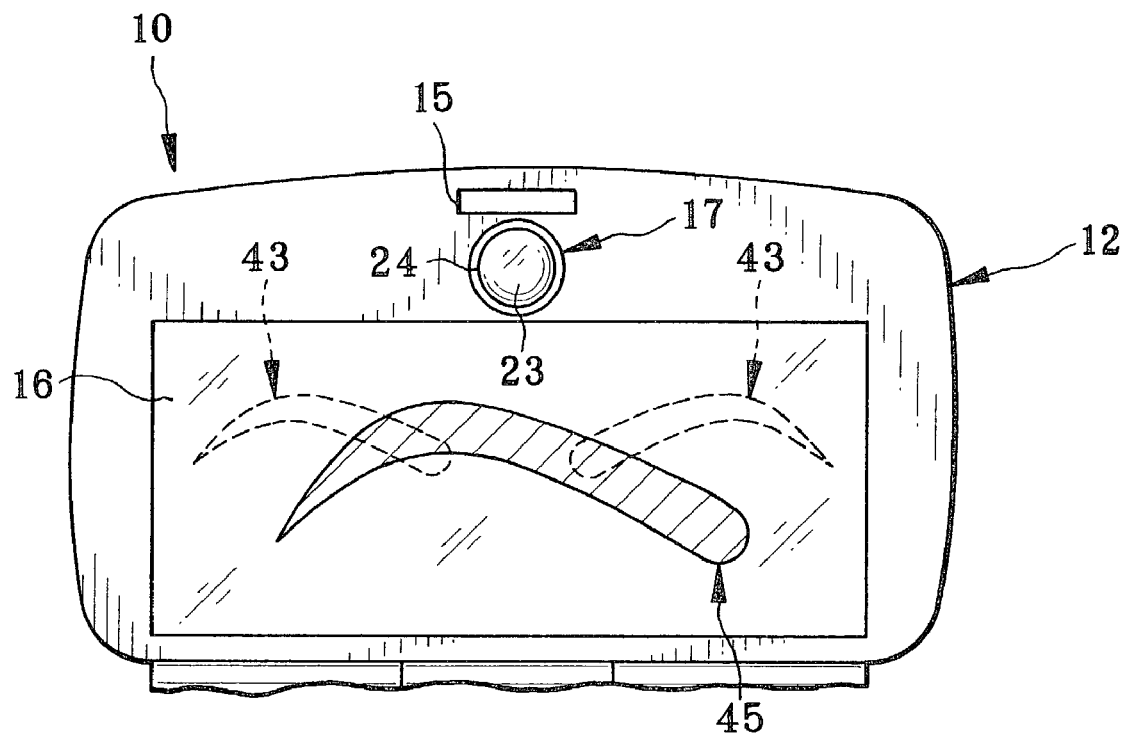
FIGS. 6A and 6B are explanatory illustrations showing a state in that the makeup mirror apparatus is used under an enlargement mode.

When finishing the outline in a more beautiful state and arranging edge shapes of the leading portion 43a and the trailing portion 43c, namely when performing the fine makeup, the enlargement mode is set with the mode switching button. Upon setting the enlargement mode, the camera portion 17 is turned on to image the user's face by the CCD image sensor 25. The image of the user's face taken by the CCD image sensor 25 is enlarged and is displayed on the LCD panel 21. In the present embodiment, since the eyebrow is made up, a position of a hand 44 holding the makeup mirror apparatus 10 is adjusted so as to image the user's eyebrow with the camera portion 17. Upon this, an enlarged image 45 of the user's eyebrow is displayed such as shown in FIG. 6A. Incidentally, this moment is just after switching the normal mode to the enlargement mode so that the eyebrows 43 of the sample image are displayed similarly to the normal mode.

Figure 6B:
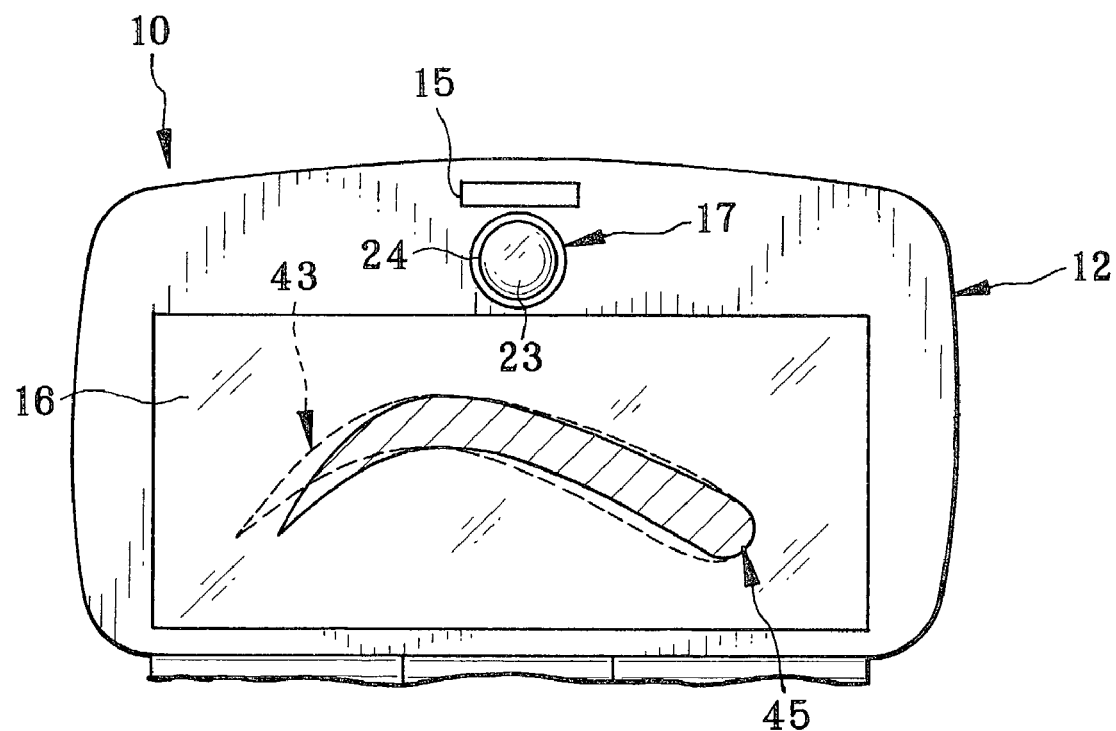

Successively, the user manipulates the operation button 28 such that an amplification of the eyebrow 43 and a position thereof are adjusted so as to correspond to the enlarged image 45 of the user's eyebrow. Upon adjusting the sample image in this way, the enlarged image 45 and the eyebrow 43 of the sample image are displayed in a overlapping state (see FIG. 6B). After that, similarly to the makeup under the normal mode, the eyebrow 43 of the sample image is traced, applying the cosmetic material to the user's eyebrow with the eyebrow brush 32 and writing the user's eyebrow with the eye pencil 33. Incidentally, in FIG. 6, only one eyebrow is displayed for the purpose of displaying the enlarged image as large as possible. However, this is not exclusive. Both eyebrows may be displayed in a state that the eyebrows are enlarged within an extent staying in the LCD panel 21.

In the above embodiment, the eyebrow is made up as an example. The present invention, however, is not exclusive to the eyebrow. Another portion of the face, for instance a lip, may be made up. Alternatively, instead of the partial makeup, the whole of the user's face may be made up by displaying a sample image of the whole face.

Figure 7:
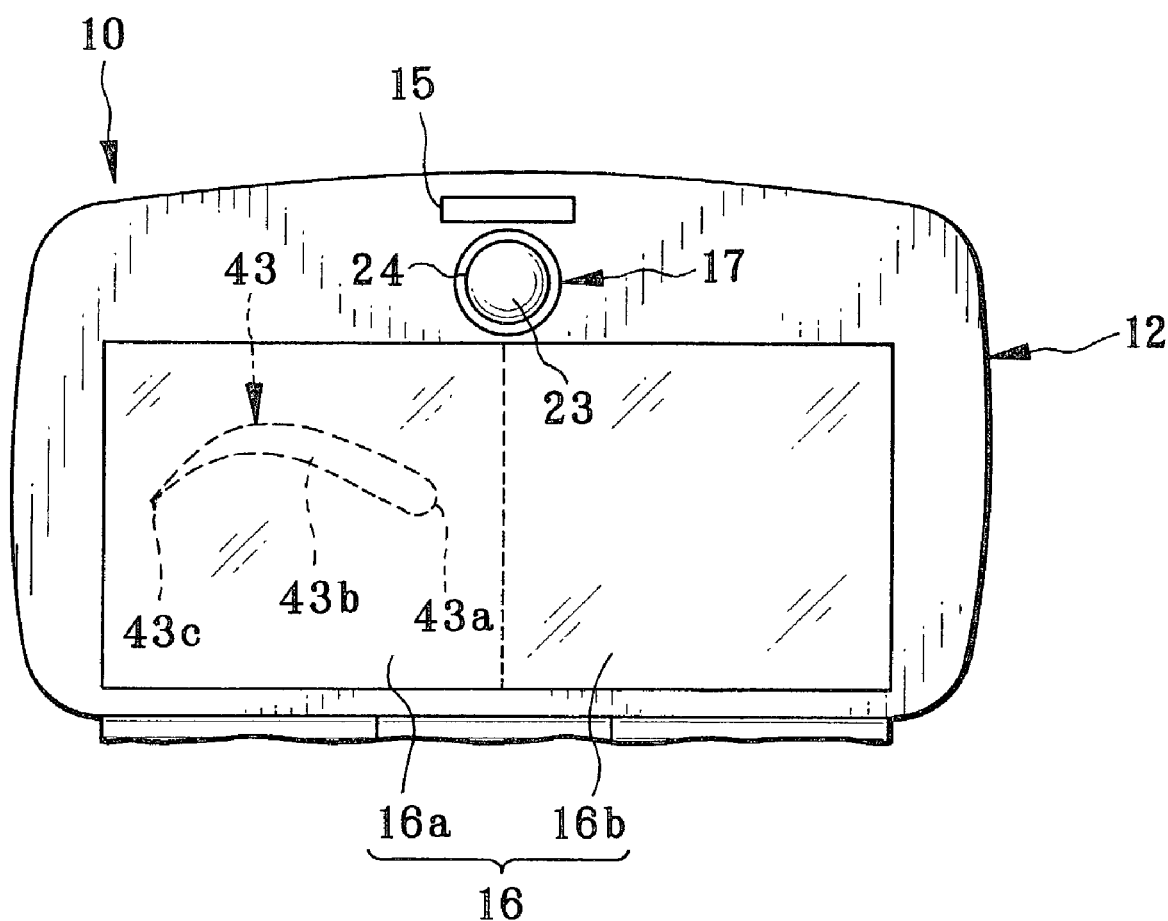
FIG. 7 is an explanatory illustration showing a state in that the makeup mirror apparatus is used in another way.
Figure 8:
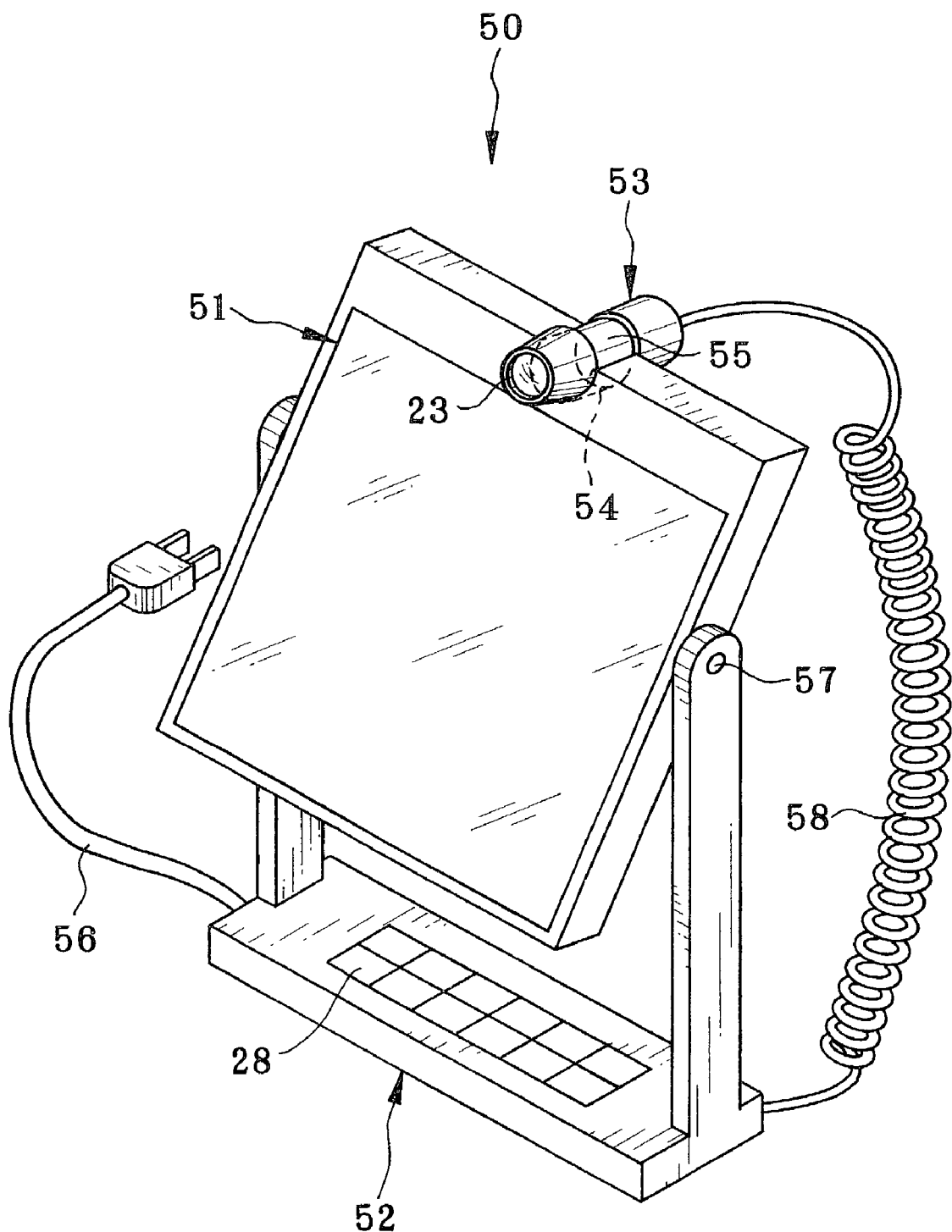
FIG. 8 is a perspective view showing a makeup mirror apparatus of a second embodiment.

In the above embodiment, the user's eyebrow is overlapped with the sample image to trace it for making up. The present invention, however, is not exclusive. Such as shown in FIG. 7, the mirror unit 16 may be divided into two areas of a left area 16a and a right area 16b. In this case, the eyebrow 43 of the sample image is displayed only on the left area 16a, and the user's face reflected in the right area 16b is made up so as to become symmetry relative to the sample image.

Next, a second embodiment of the present invention is described below. In the above first embodiment, the makeup mirror apparatus has the exterior which is identical with a cosmetic compact case. In contrast, the second embodiment relates to a makeup mirror apparatus of a desktop style having a form of a cosmetic mirror mainly used in a home. Incidentally, a member identical with that of the first embodiment is denoted by the same reference numeral and the description thereof is abbreviated.

A makeup mirror apparatus 50 according to this embodiment comprises a mirror unit 51, a support 52 for supporting the mirror unit 51, and a camera portion 53. The mirror unit 51 has a similar structure with the mirror unit 16 of the first embodiment. The mirror unit 51 is constituted of the LCD panel 21 and the half mirror 22 stacked thereon. An upper portion of the mirror unit 51 is formed with a concave 54 for attaching the camera portion 53. The camera portion 53 has a cylindrical exterior 55 in which the taking lens 23 and the CCD image sensor 25 similar to the first embodiment are incorporated. The exterior 55 of the camera portion 53 is formed so as to have a periphery corresponding to the concave 54 of the mirror unit 51. The camera portion 53 is removably attached to the mirror unit 51.

The support 52 is provided with the operation button 28 and a power cord 56. The support 52 rotatably supports the mirror unit 51 via a rotary shaft 57. The camera portion 53 is connected to the support 52 via a cord 58. The power cord 56 is connected to an outlet of a home to supply a power to the makeup mirror apparatus 50.

An operation of the above-mentioned structure is described below. When the makeup mirror apparatus 50 is used, the power cord 56 is connected to the outlet of the home to turn on the power supply. Then, the operation button 28 is handled to select a usage mode. At this time, the mirror unit 51 is rotated around the rotary shaft 57 for adjusting an angle thereof so as to reflect the user's face in a good state. In this embodiment, a close-up mode is provided besides the normal mode and the enlargement mode, which are identical with the first embodiment. Under the close-up mode, the camera portion 53 is removed from the mirror unit 51 and is used separately therefrom.

Figure 9:
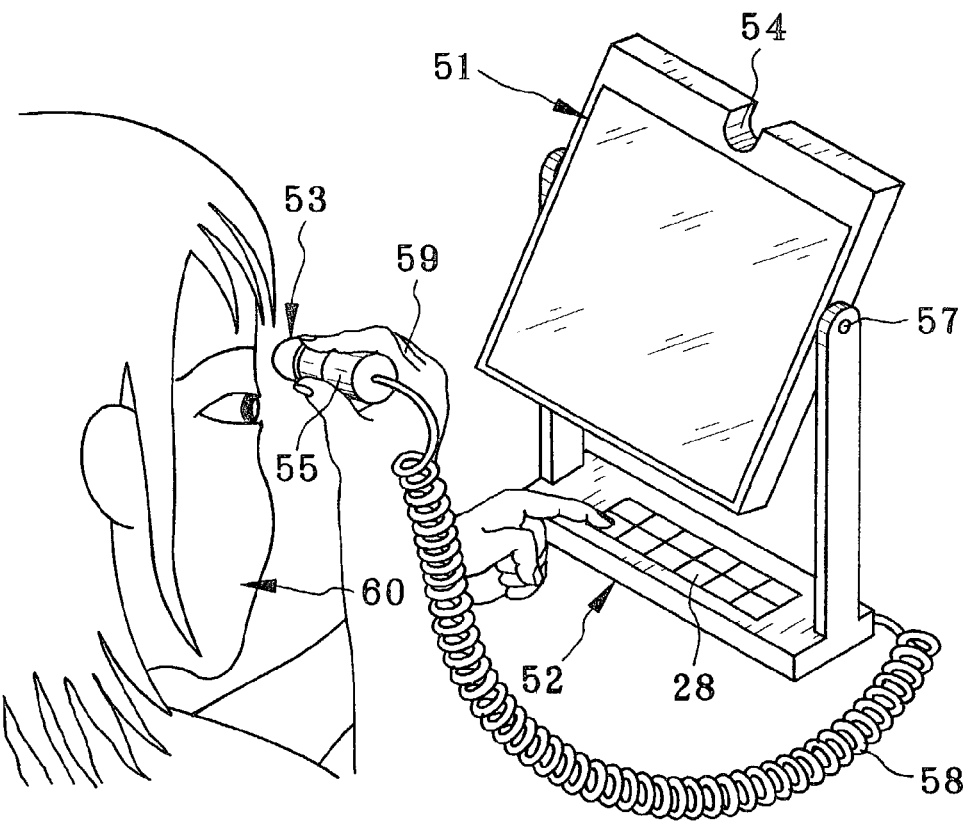
FIG. 9 is a perspective view showing a usage state of the makeup mirror apparatus shown in FIG. 8.

Under the normal mode and the enlargement mode, the sample image is displayed on the LCD panel 21 in a similar way to the first embodiment. The sample image is traced to perform the makeup. After performing the makeup under the normal mode and the enlargement mode, the close-up mode is successively selected when it is desired to confirm a finish of the makeup. Under the close-up mode, the camera portion 53 is removed from the mirror unit 51 and is held by a user's hand 59 such as sown in FIG. 9. The taking lens 23 of the camera portion 53 is laid to a user's face 60 to display an enlarged image of the face on the LCD panel 21. By doing so, it is possible to confirm the finish of the makeup, for instance, a color and a shape of an eyebrow and a lip.

Figure 10:
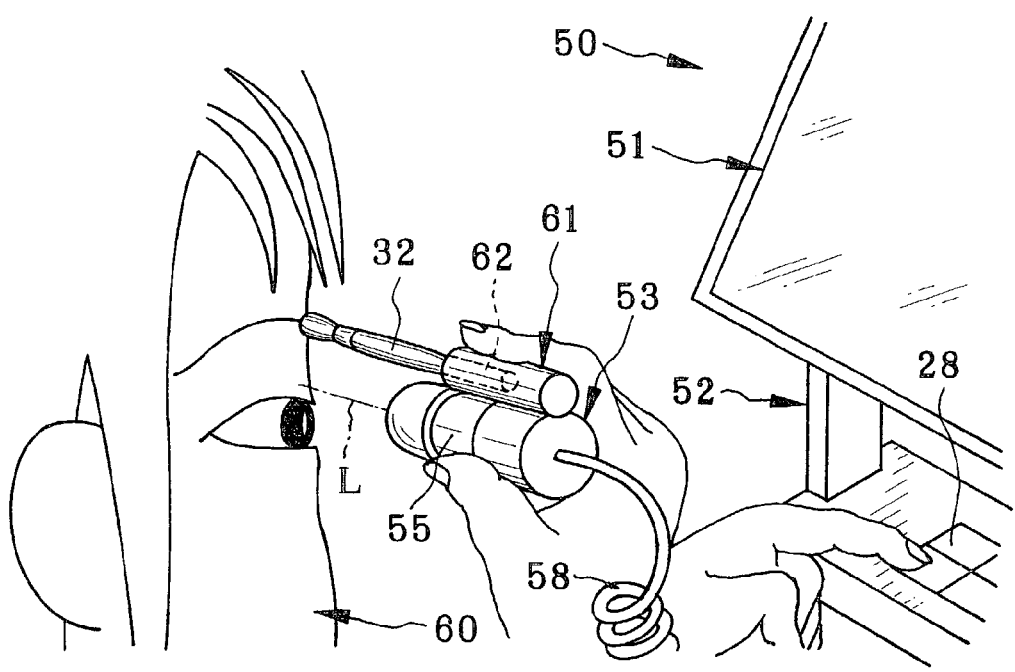
FIG. 10 is a perspective view showing an example in which the makeup mirror apparatus shown in FIG. 8 is integrally formed with an attachment for attaching a cosmetic tool.

By the way, under the close-up mode in the second embodiment, the makeup mirror apparatus 50 is used only for the purpose of confirming the finish of the makeup. However, by slightly improving the camera portion 53 such as shown in FIG. 10, the fine makeup may be easily performed so that it is possible to finish the makeup in a more beautiful state. In this case, the exterior 55 of the camera portion 55 is integrally formed with an attachment 61 for attaching a cosmetic tool. The attachment 61 is provided with a fitting hole 62 formed on a parallel with the optical axis L of the taking lens 23. The cosmetic tool of the eyebrow brush 32, the eye pencil 33, a lipstick and so forth is fitted into the fitting hole 62 so that the cosmetic tool is removably attached thereto. Owing to this, in the state that the camera portion 53 is laid to the user's face under the close-up mode, it becomes possible to perform the makeup with the cosmetic tool fixed to the attachment 61, displaying the enlarged image of the face on the LCD panel 23. In this way, the fine makeup may be easily performed.

Figure 11:
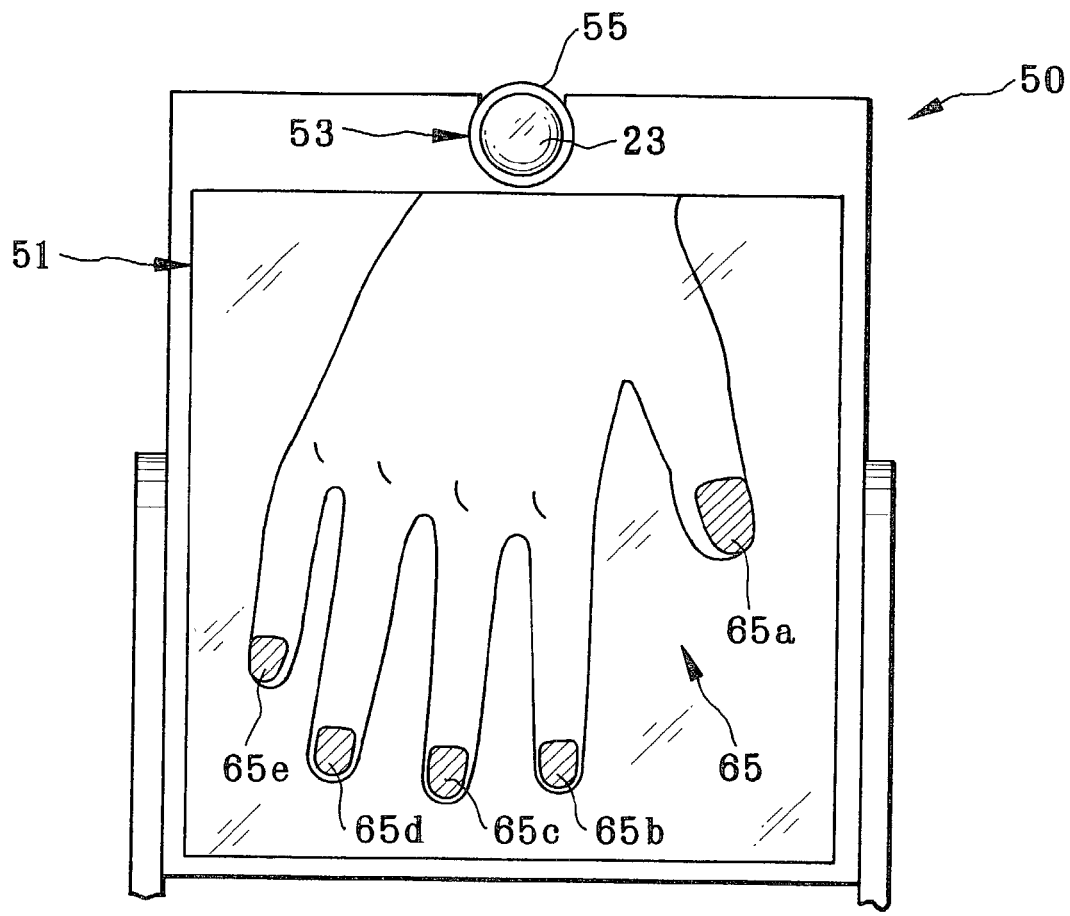
FIG. 11 is an explanatory illustration showing a state of the makeup mirror apparatus used for making up nails.
Figure 12:
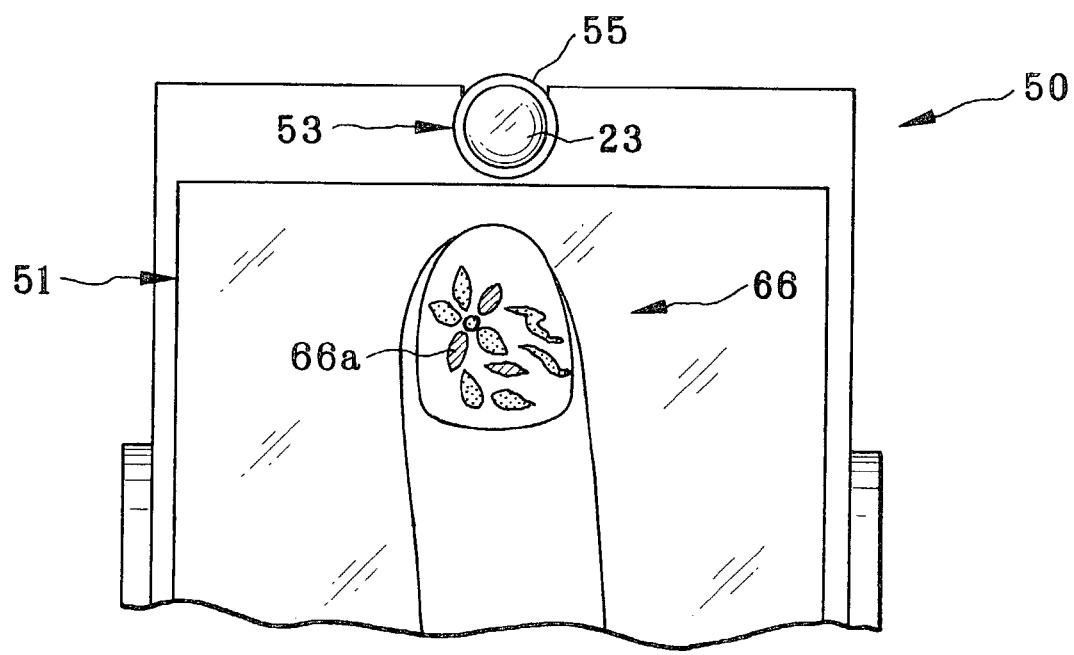
FIG. 12 is an explanatory illustration showing a state in that a sample image of the nail is displayed when making up the nail.
Figure 13:
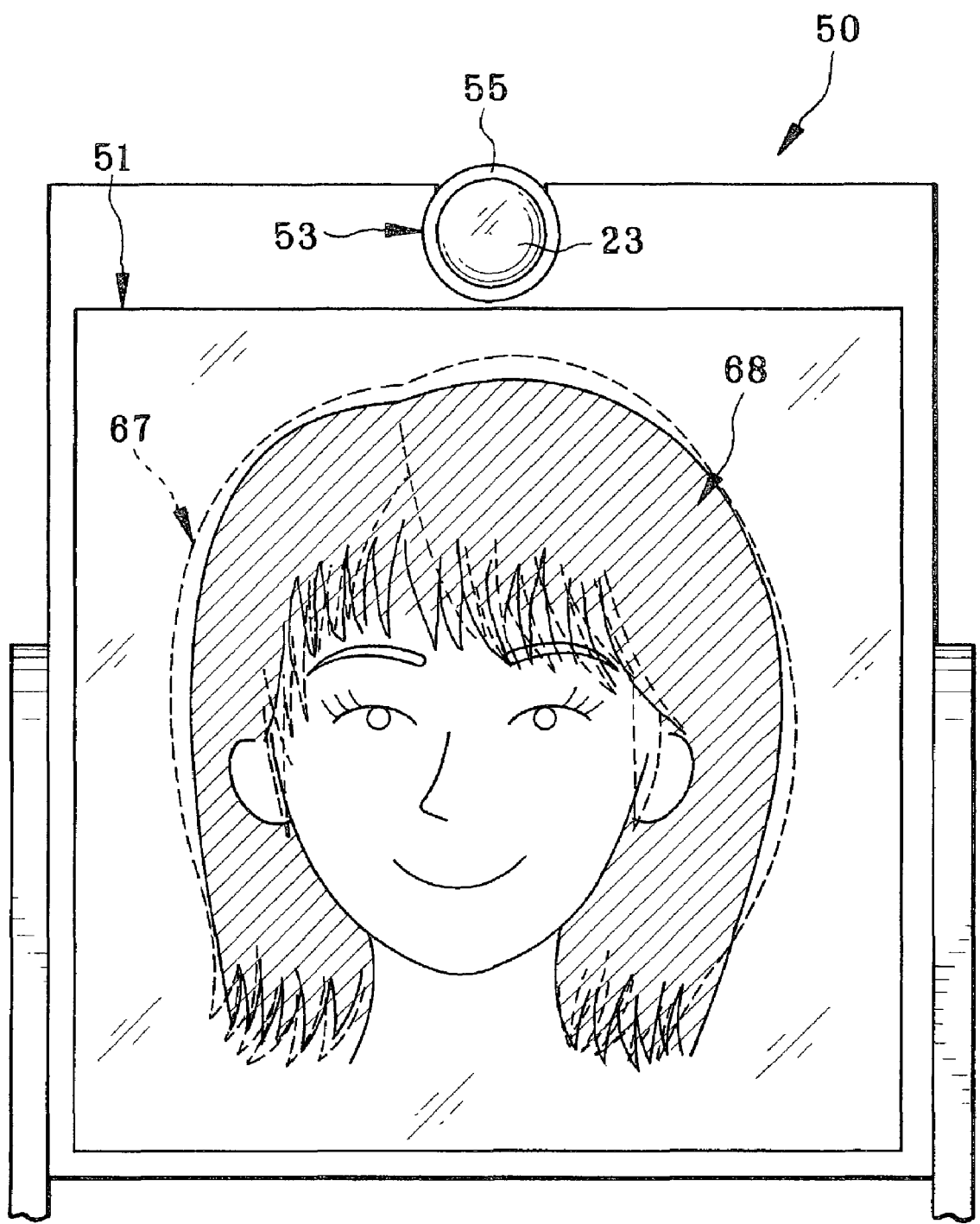
FIG. 13 is an explanatory illustration showing a state of the makeup mirror apparatus used for setting a hair style.

The first and second embodiments describe the makeup performed for the lip, the eyebrow and so forth of the user's face. The present invention, however, is not exclusive to the face. The makeup may be performed for any part of the user. For example, such as shown in FIGS. 11 and 12, the present invention may be applicable to manicure of a nail. Further, such as shown in FIG. 13, the present invention may be applicable to hair styling. The following description relates to the manicure and the hair styling. A member identical with that of the foregoing embodiments is denoted by the same reference numeral and the description thereof is abbreviated.

FIG. 11 shows a state in that the manicure is performed for the nails under the normal mode. The LCD panel 21 of the mirror unit 51 displays a sample image 65 used for the manicure. The user adjusts positions of nails 65a through 65e of the sample image 65 to positions of user's nails reflected in the half mirror 22. And then, nail polish is applied so as to correspond to a color and a shape of the sample image. In this way, manicure is performed for the nail. The sample image of the manicure may be a color pattern or the like indicating many colors, instead of displaying the shape and the color of the nail. Alternatively, such as shown in FIG. 12, a sample image 66 for performing the manicure (nail art), in which a painting is drawn on the nail, may be displayed. In this case, the user draws the painting on the nail so as to correspond to a picture 66a of the sample image 66. Such operations may be performed by using the camera portion 53 under the enlargement mode and the close-up mode. Further, the nail polish may be applied by attaching a manicure brush to the camera portion 53.

As to the hair styling, a sample image 67 of a hair style is displayed such as shown in FIG. 13. A position of user's hair 68 is adjusted to a position of the sample image 67. After that, are carried out hair cutting, hair blowing, and coloring so as to correspond to a shape and a color of the sample image 67. In this way, hair styling is performed.

Image data of the sample image used for the manicure and the hair styling may be read from a storage medium of a memory card and so forth, in which various patterns of the sample images are stored, similarly to the first and second embodiments. Alternatively, it is considered to photograph the manicure and the hair styling finished by professionals (nail artist and hairdresser) at a nail salon and a hair salon. The image data obtained in this way may be used as the sample image.

In the first and second embodiments, the half mirror is disposed in front of the LCD panel to constitute the mirror unit. The present invention, however, is not exclusive to this. For example, as a mirror for reflecting the user's face, a total-reflection mirror identical with a normal cosmetic mirror may be used. In this case, a liquid-crystal panel of a transmission type is disposed so as to cover the front of the total-reflection mirror. One's makeup may be performed such that the user's face reflected in the total-reflection mirror is overlapped with the sample image displayed on the liquid-crystal panel of the transmission type. Meanwhile, the member for displaying the sample image and the enlarged image is not exclusive to the liquid-crystal panel. It is possible to use a thin electronic display unit to be stacked on a mirror reflecting the user's face. As to this kind of the electronic display unit, it is possible to use an electronic display unit of well-known DLP (digital micromirror device) system. It is also possible to use an electronic display unit in which self-luminous-type EL elements respectively covered with plural kinds of color filters are arranged every pixel.

In the above embodiment, the mirror for reflecting the user is unified with the electronic display unit, which displays the sample image and so forth, to constitute the mirror unit. However, this is not exclusive. The electronic display unit and the camera portion may be separated parts relative to the mirror so as to be removably attached to a compact case and a cosmetic stand, which are used as a normal cosmetic mirror. In this case, the electronic display unit and the camera portion may be attached only when the user wants to use them.

In the first and second embodiments, the CCD image sensor is used as an imaging device. The present invention, however, is not exclusive to the CCD image sensor. Another imaging device, for instance, a CMOS image sensor may be used. Further, with respect to the memory card for recording the data of the sample image, the smart media (registered trademark) is not exclusive. It is possible to use another recording medium of memory stick (registered trademark), compact flash (registered trademark) and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A makeup mirror apparatus used when a user performs a makeup, comprising:
   a mirror for reflecting the user;
   a memory which stores a sample image utilized as a reference when the user makes up;
   an electronic display for displaying said sample image when the user makes up;
   a compact case having a case body and an upper lid, said case body containing a cosmetic tool and said upper lid inwardly containing said mirror and said electronic display, and
   a camera portion for imaging the user to display at least a part of the user on said electronic display in an enlargement state,
   wherein said mirror and said electronic display are stacked to constitute a unified mirror unit.

2. A makeup mirror apparatus according to claim 1, wherein said mirror is a half mirror and is disposed in front of said electronic display.

3. A makeup mirror apparatus according to claim 1, wherein said electronic display is a liquid-crystal panel of a transmission type and is disposed in front of said mirror.

4. The makeup mirror apparatus according to claim 1, further comprising a plurality of sample images.

5. A makeup mirror apparatus used when a user performs a makeup, comprising:
- a mirror for reflecting the user;
- an electronic display for displaying a sample image utilized as a reference when the user makes up;
- a compact case having a case body and an upper lid, said case body containing a cosmetic tool and said upper lid inwardly containing said mirror and said electronic display; and
- a memory card for storing said sample image, said memory card being removably attached to a slot formed in said upper lid.

6. A makeup mirror apparatus according to claim 5, further comprising an operation button provided on said compact case, said operation button reading said sample image, which is stored in said memory card, from said memory card.

7. A makeup mirror apparatus used when a user performs a makeup, comprising:
- a mirror for reflecting the user;
- an electronic display for displaying a sample image utilized as a reference when the user makes up; and
- a camera portion for imaging the user to display at least a part of the user on said electronic display in an enlargement state,
- wherein said mirror and said electronic display are stacked to constitute a unified mirror unit,
- wherein said camera portion is fixed above the mirror unit.

8. A makeup mirror apparatus used when a user performs a makeup, comprising:
- a mirror for reflecting the user;
- an electronic display for displaying a sample image utilized as a reference when the user makes up; and
- a camera portion for imaging the user to display at least a part of the user on said electronic display in an enlargement state,
- wherein said mirror and said electronic display are stacked to constitute a unified mirror unit,
- wherein said camera portion is removably attached to said mirror unit at a position above the mirror, and is capable of being held by a user's hand to image a detail of a user's face.

9. A makeup mirror apparatus according to claim 8, further comprising:
- a support for rotatably supporting said mirror unit, the user adjusting a rotational angle of said mirror unit when making up.

10. A makeup mirror apparatus according to claim 9, further comprising an operation button of the support manipulated by the user, said sample image being displayed on said electronic display by manipulating said operation button.

11. A makeup mirror apparatus according to claim 8, wherein said camera portion is provided with an attachment to which a cosmetic tool for making up the user is detachably attached.

12. A makeup mirror apparatus according to claim 11, wherein said cosmetic tool is one of an eyebrow brush, an eye pencil, and a lipstick.

13. A makeup method for performing a makeup by using a makeup mirror apparatus having an electronic display and a mirror stacked on said electronic display, said makeup method comprising the steps of:
- displaying a sample image on said electronic display, said sample image being utilized as a reference when a user of said makeup mirror apparatus makes up;
- overlapping the displayed sample image with at least a part of the user corresponding to the sample image; and
- performing the makeup by tracing a shape of said sample image with a cosmetic tool.

14. A makeup method for performing a makeup by using a makeup mirror apparatus having a camera portion and an electronic display for displaying an image taken by said camera portion, said makeup method comprising the steps of:
- imaging a user of said makeup mirror apparatus with said camera portion;
- displaying at least a part of the imaged user on said electronic display, said part of the user being displayed in an enlargement state;
- displaying a sample image, which is utilized as a reference for the makeup, on said electronic display so as to overlap with the part of the user displayed in the enlargement state; and
- performing the makeup by tracing a shape of said sample image with a cosmetic tool.

15. A makeup mirror apparatus according to any one of claims 1, 13 and 14, wherein the makeup is to apply a cosmetic material to a user's face.

16. A makeup mirror apparatus according to any one of claims 1, 13 and 14, wherein the makeup is to apply a nail polish to a user's nail.

17. A makeup mirror apparatus according to any one of claims 1, 13 and 14, wherein the makeup is to set a user's hair style.

* * * * *